United States Patent
Kammer et al.

(10) Patent No.: US 6,950,645 B1
(45) Date of Patent: Sep. 27, 2005

(54) POWER-CONSERVING INTUITIVE DEVICE DISCOVERY TECHNIQUE IN A BLUETOOTH ENVIRONMENT

(75) Inventors: David Kammer, Seattle, WA (US); E. Michael Lunsford, San Carlos, CA (US)

(73) Assignee: PalmSource, Inc., Sunnyvale, CA (US)

( * ) Notice: Subject to any disclaimer, the term of this patent is extended or adjusted under 35 U.S.C. 154(b) by 553 days.

(21) Appl. No.: 09/675,047

(22) Filed: Sep. 28, 2000

(51) Int. Cl.[7] .................................. H04B 1/16
(52) U.S. Cl. .................. 455/343.1; 455/41.2; 455/574; 370/338
(58) Field of Search .................. 455/343.1–343.3, 455/41.2, 41.3, 574; 370/338, 311

(56) References Cited

U.S. PATENT DOCUMENTS

| | | | |
|---|---|---|---|
| 5,625,882 A * | 4/1997 | Vook et al. ............... | 455/343.4 |
| 5,657,317 A * | 8/1997 | Mahany et al. ........... | 455/343.1 |
| 5,682,379 A * | 10/1997 | Mahany et al. ........... | 455/343.1 |
| 6,438,585 B2 * | 8/2002 | Mousseau et al. ......... | 455/41.2 |
| 6,529,748 B1 * | 3/2003 | Bruner ..................... | 455/343.2 |
| 2004/0125776 A1 * | 7/2004 | Haugli et al. ............... | 370/338 |
| 2004/0218556 A1 * | 11/2004 | Son et al. .................... | 370/311 |
| 2005/0070340 A1 * | 3/2005 | Kim ........................... | 455/574 |

* cited by examiner

Primary Examiner—Lana Le
(74) Attorney, Agent, or Firm—Berry & Associates P.C.

(57) ABSTRACT

A method and system for managing when a responder device (a device having a transceiver for wireless communication) is operating in a discoverable mode in a wireless network of devices, such as a Bluetooth network. In the discoverable mode, the responder device is set to scan for and respond to general inquiry messages broadcast from another device (e.g., an initiator device). When in the non-discoverable mode, the responder device will not respond to and/or scan for general inquiry messages broadcast from an initiator device. The responder device automatically enters the discoverable mode when the responder device enters into its awake mode. The responder device automatically enters the non-discoverable mode when the device enters into its sleep mode. Therefore, the responder device will be in discoverable mode for a reduced period of time, and as such will respond to fewer general inquiry messages. Accordingly, fewer messages will be exchanged between devices in the wireless network, simplifying the device discovery process for users and conserving the battery resources of the initiator and responder devices.

26 Claims, 8 Drawing Sheets

700a

700b

POWER-CONSERVING INTUITIVE DEVICE DISCOVERY TECHNIQUE IN A BLUETOOTH ENVIRONMENT

TECHNICAL FIELD

The present invention relates to networks of devices that can be connected using wireless links, in particular devices that use the Bluetooth technology. Specifically, the present invention pertains to a method and system for managing the Bluetooth device discovery process.

BACKGROUND ART

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the Bluetooth technology. Bluetooth is the code name for a technology specification for short-range radio links that will allow the many proprietary cables that connect devices to one another to be replaced with short-range radio links.

The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone. Printers, personal digital assistants (palmtop computer systems, hand-held devices and the like), desktop computer systems, fax machines, keyboards, joysticks and virtually any other digital device can be part of a Bluetooth system. Bluetooth radio technology can also provide a universal bridge to existing data networks and a mechanism to form small private ad hoc groupings ("scatternets" or "piconets") of connected devices away from fixed network infrastructures.

The Bluetooth technology allows Bluetooth devices to "discover" other Bluetooth devices that are within range and then connect with those devices, either automatically or at a user's discretion. The Generic Access Profile (GAP) of the Bluetooth specification (Section 6 of "Specification of the Bluetooth System, Core," version 1.0B, dated Dec. 1, 1999, herein incorporated by reference as background) describes the processes by which Bluetooth devices discover each other. The device discovery process has two primary steps: an inquiry step (described in Sections 6.1 and 6.2 of the Bluetooth specification), and a name discovery step (described in Section 6.3 of the Bluetooth specification). In the inquiry step, the Bluetooth devices make their presence known to each other and exchange attributes (e.g., addresses) needed to further the connection process. In the name discovery step, user-friendly names are exchanged to help a user identify Bluetooth devices that are in the environment. The inquiry and discovery steps are described in further detail below.

Prior Art FIG. 1 is a data flow diagram 10 illustrating the device discovery process used by one Bluetooth device (initiator device 20) to discover another Bluetooth device (e.g., responder device 30). First, initiator device 20 sends (broadcasts) a general inquiry message (e.g., inquiry 40) over the nominal range of a typical Bluetooth device (e.g., approximately 10 meters). When initiator device 20 broadcasts an inquiry 40, it typically remains in the inquiry state for 10.24 seconds (this time is programmable, but the Bluetooth specification recommends 10.24 seconds).

In order to receive and respond to inquiry 40, responder devices 30 and 32 must be "discoverable" (e.g., the devices must be scanning for inquiry messages). According to the Bluetooth specification referenced above, a discoverable device enters into "inquiry scan" (scanning for inquiry messages) every 2.56 seconds and remains in inquiry scan for 10.625 milliseconds.

Responder devices 30 and 32 send inquiry responses 42a and 42b, respectively, to initiator device 20 in response to inquiry 40. Inquiry responses 42a and 42b provide the Bluetooth device addresses (a numerical address or a device access code) for responder devices 30 and 32, and optionally provide additional information such as the clock, class of device and page scan mode. Inquiry responses 42a and 42b do not provide a name (or user-friendly name) for responder devices 30 and 32. The user-friendly name can be up to 248 characters long and is not provided in order to reduce the length of the inquiry responses.

Initiator device 20 can therefore receive an inquiry response from multiple Bluetooth devices (e.g., responder devices 30 and 32), providing each devices' numerical address at least. Generally, a user will not be able to identify one type of responder device over another based only on the device's numerical address. For example, there may be two printers in proximity, and the user generally will not be able to tell which printer to connect with based on the numerical address. However, "user-friendly names" can be used to identify each printer's location and features, allowing the user to make a selection of one over the other. Therefore, initiator device 20 needs to discover and display the user-friendly name for each of the devices that responded, so that the user can select the appropriate device with which to connect.

To accomplish this, initiator device 20 must connect one device at a time to each of the responder devices 30 and 32 in order to request a user-friendly name. Accordingly, initiator device 20 sends pages 44a and 44b to each device that responded to inquiry 40. In response to the pages 44a and 44b, responder devices 30 and 32 send page responses 46a and 46b, respectively. Page responses 46a and 46b provide the user-friendly name for responder devices 30 and 32, respectively.

Next, initiator device 20 will send name requests 48a and 48b to responder devices 30 and 32, respectively. In response to name request 48a, responder device 30 sends name request response 50a to initiator device 20. Similarly, in response to name request 48b, responder device 32 sends name request response 50b to initiator device 20. Name request responses 50a and 50b provide the user-friendly names for responding devices 30 and 32, respectively. The user-friendly names are displayed to the user, who can then select one or more of the responder devices with which to connect.

There are a number of disadvantages associated with the Bluetooth device discovery process described above. One disadvantage is that, while in discoverable mode, responder devices 30 and 32 are scanning for and receiving messages, and thus are consuming power. In addition, when an inquiry 40 is received, responder devices 30 and 32 will send an inquiry response (e.g., 42a and 42b, respectively) to initiator device 20, consuming more power. Thus, even when responder devices 30 and 32 are powered down (turned off), they can still be scanning for, receiving and responding to inquiry messages, and as such will continue to consume power.

Power consumption is of particular concern to limited power devices (battery-powered devices) such as laptop computer systems, cell phones, personal digital assistants (PDAs), including palmtop computer systems, hand-held devices, and the like. These devices are limited in size and weight, and therefore they typically use smaller and lighter batteries of limited capacity. As described above, when PDAs and other such devices are turned off (powered down), they may remain discoverable in the Bluetooth environment. Consequently, even when powered down, these devices will scan for and receive general inquiry messages (e.g., inquiry 40), and will send responses (e.g., inquiry response 42$a$) to such messages, and thus will continue to draw from their limited battery power. Thus, the Bluetooth device discovery process can consume the limited power (battery) resources that are typically available to PDAs and other such devices. Accordingly, more frequent battery charges may be needed, inconveniencing the user.

This problem is exacerbated as Bluetooth devices grow in number and popularity. With more Bluetooth devices in use, a device (such as responder device 30) will receive inquiries (e.g., 40$c$–40$h$) from each of the many possible initiator devices in broadcast range. Furthermore, each inquiry 40$c$–40$h$ engenders an inquiry response from responder device 30, accelerating the rate of power consumption.

Another disadvantage to the Bluetooth device discovery process is that it can become unmanageably large, especially with the increasing number of Bluetooth devices. That is, as the number of Bluetooth devices grows, an increasing number of messages (inquiries and inquiry responses, and pages and page responses) will be generated as each device undertakes the device discovery process. The probability that these messages will collide with other will likely increase, increasing the frequency at which messages have to be retransmitted. Devices responding to one message will have to ignore other messages, and the messages that are ignored will have to be retransmitted. The increase in messages will further increase the burden on the limited power resources of both initiator and responding Bluetooth devices.

In addition, in the name discovery step of the device discovery process, each device provides its user-friendly name for display to the user. As the number of Bluetooth devices continues to grow, the length of the list of user-friendly names will grow as well, which can complicate the user experience.

Yet another problem with the Bluetooth device discovery process is that an initiator device 20 can undertake the process and connect with responder device 730 without the user's knowledge and permission. Thus, for example, initiator device 20 can retrieve the user-friendly name and the address of responder device 30, even if the user has no desire to share this information with unknown devices.

One possible solution to the problems described above is to allow the user to manage the device discovery process. However, this solution is also problematic because it requires the user to learn and understand the device discovery process defined by the Bluetooth specification. This may be beyond the capability of some users, while other users would instead prefer a user-friendly process that either fits into a usage model that they already understand.

Thus, the Bluetooth device discovery process presents a number of problems. Finding a solution to these problems is made more complex because the solution must be substantially compliant with the Bluetooth specification. That is, many Bluetooth devices are being designed and manufactured according to the Bluetooth specification. Consequently, a solution that relies on a significant deviation from the Bluetooth specification will create new problems, such as incompatibility between newer Bluetooth devices and legacy Bluetooth devices. An aim of the Bluetooth specification is to provide a level of standardization across all Bluetooth devices, and a substantial deviation from the specification would be contrary to that aim. Accordingly, any solution to the prior art problems described above should be satisfactorily consistent with the Bluetooth specification, or it should be a solution that can be incorporated into legacy Bluetooth devices.

DISCLOSURE OF THE INVENTION

Accordingly, a need exists for a system and/or method for managing the Bluetooth device discovery process. A need also exists for a system and/or method that can satisfy the above need and that can reduce the burden on the limited power resources available to many types of Bluetooth devices. In particular, a need exists for a system and/or method that can satisfy the above needs and that is consistent with the Bluetooth specification, and that can be implemented in Bluetooth-enabled devices including legacy Bluetooth devices. What is also needed is a system and/or method that can satisfy the above needs and that is user-friendly. The present invention provides these advantages and others not specifically mentioned above but described in the sections to follow.

The present invention pertains to method and system for managing when a responder device (a device having a transceiver for wireless communication) is operating in a discoverable mode in a wireless network of devices. In accordance with the present embodiment of the present invention, the responder device automatically enters the discoverable mode when the responder device enters into its awake mode. The responder device automatically enters a non-discoverable mode when the device enters into its standby (or sleep) mode. In the discoverable mode, the responder device is set to scan for and/or respond to wireless signals that are broadcast from another device (e.g., an initiator device). When in the non-discoverable mode, the responder device will not scan for and/or will not respond to wireless signals broadcast from an initiator device. In a preferred embodiment, the devices are Bluetooth-enabled devices. In one Bluetooth embodiment, when in the non-discoverable (standby or sleep) mode, the responder device will not scan for and/or will not respond to general inquiry messages broadcast by an initiator device.

In another Bluetooth embodiment, the responder device will be in the connectable mode at all times (even when in the non-discoverable or standby mode). In the connectable mode, the responder device will respond to wireless signals (such as pages or name requests) directed to the responder device. Accordingly, embodiments of the present invention reduce the time that the responder device can be discovered by unknown initiator devices, but still allow the responder device to make a connection with a known initiator device (that is, an initiator device that has previously completed the device discovery process with the responder device).

Therefore, in accordance with the present invention, the responder device automatically makes itself discoverable or non-discoverable depending on whether the device is, respectively, awake (powered on) or asleep (powered off). Accordingly, the device discovery process can be managed in a way that is both user-friendly and intuitively understood by the user; that is, when the responder device is powered on by the user, it is made discoverable, and when the responder device is powered off, it is made non-discoverable. As a result, the responder device will be in discoverable mode for a reduced period of time, conserving power (battery) resources. In addition, the responder device will respond to fewer general inquiry messages, which will also reduce the number of messages that are generated as a result of the inquiry responses (such as pages and page responses, and name requests and responses to name requests). Consequently, devices in the wireless network will exchange fewer messages, simplifying the device discovery process for users as well as conserving the power (battery) resources of initiator devices as well as responder devices. With devices in the discoverable mode for reduced periods of time, the number of user-friendly names exchanged between devices will decrease, simplifying the user experience.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Figure 1:
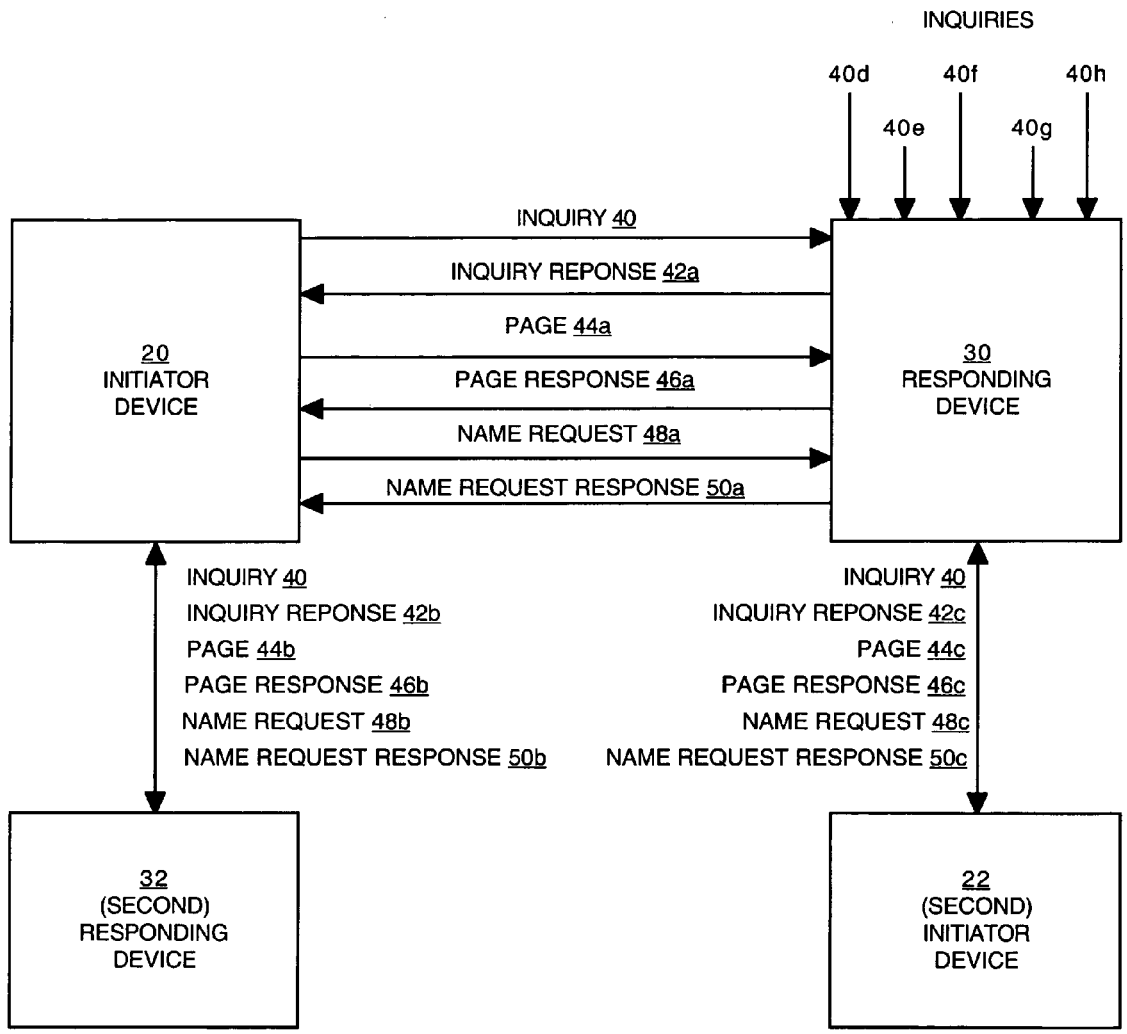
FIG. 1 is a data flow diagram illustrating one embodiment of a prior art device discovery process.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes (e.g., process 800 of FIG. 8) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), personal digital assistants (PDAs), mobile phones and other devices. The Bluetooth technology allows cables that connect devices to one another to be replaced with short-range radio links. However, it is appreciated that the present invention may be utilized with devices and systems coupled using technologies and/or protocols different from Bluetooth, including but not limited to infrared communications links as defined by the Infrared Data Association (IrDA).

In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Figure 2:
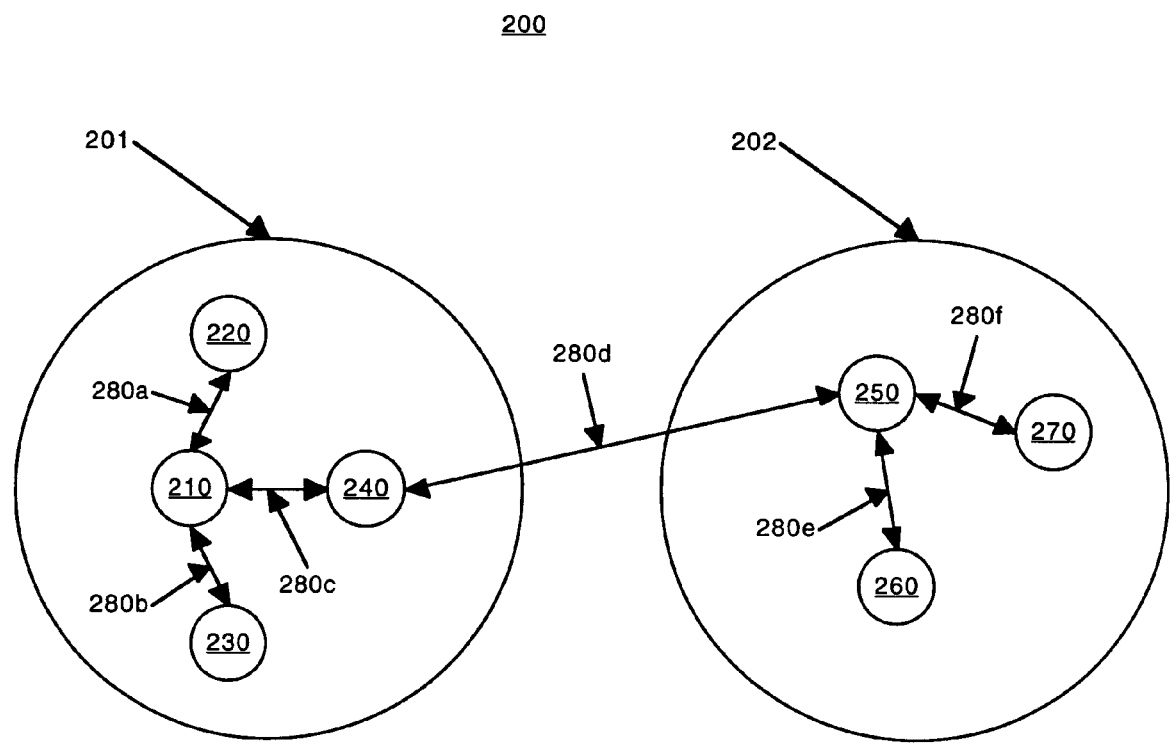
FIG. 2 illustrates a network of devices coupled using wireless connections in accordance with one embodiment of the present invention.

FIG. 2 illustrates the topology of a network 200 of devices coupled using wireless connections in accordance with one embodiment of the present invention. Devices 210, 220, 230 and 240 are coupled in piconet 201 using wireless connections 280a–c. Similarly, devices 250, 260 and 270 are coupled in piconet 202 using wireless connections 280e–f. Piconet 201 and piconet 202 are coupled using wireless connection 280d. Devices 210–270 can be printers, personal digital assistants (PDAs), desktop computer systems, laptop computer systems, cell phones, fax machines, keyboards, joysticks and virtually any other device. In the present embodiment, devices 210–270 are Bluetooth devices; that is, they are equipped with a Bluetooth radio transceiver, or they are adapted to communicate with Bluetooth devices ("Bluetooth-enabled"). The Bluetooth radio transceiver may be integrated into a device, or it may be coupled to a device.

Figure 3:
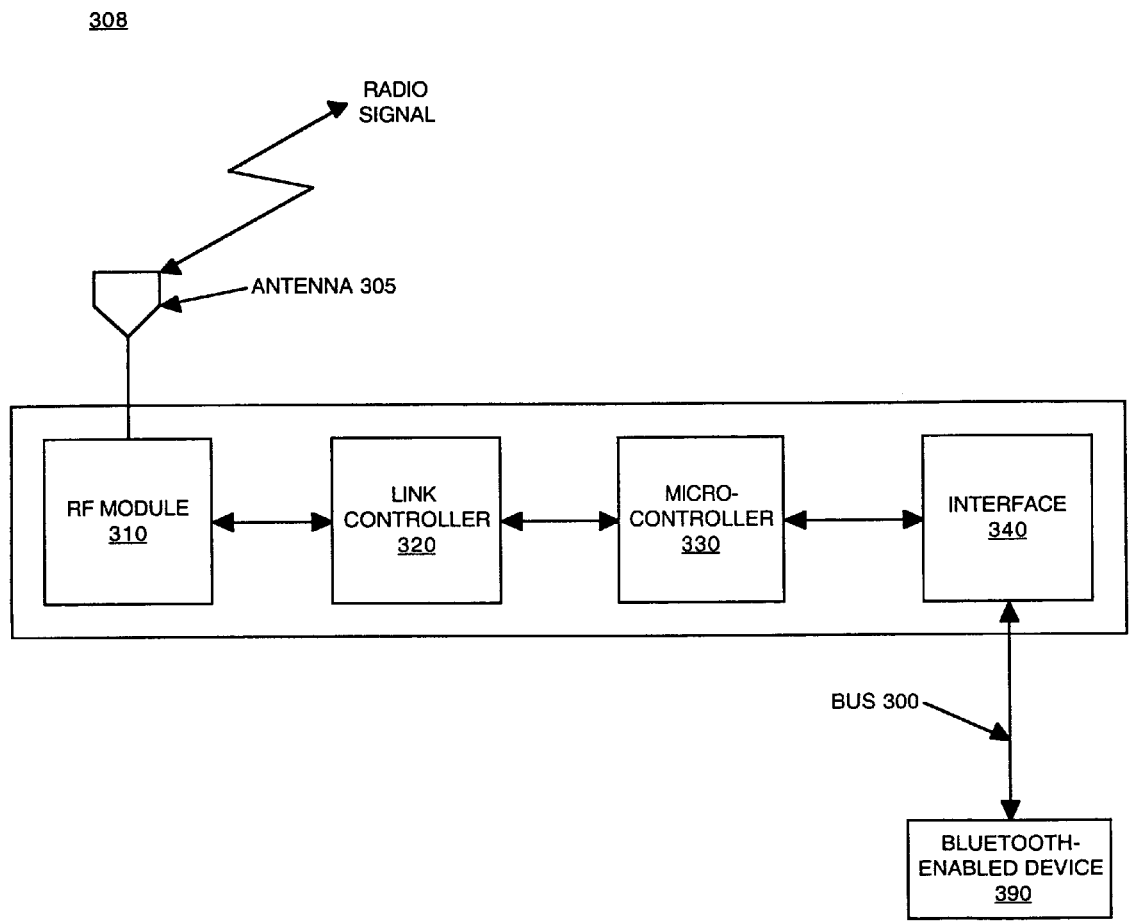
FIG. 3 is a block diagram showing one embodiment of a Bluetooth wireless transceiver in accordance with the present invention.

FIG. 3 is a block diagram of one embodiment of a transceiver 308 in accordance with the present invention. In a preferred embodiment (the "Bluetooth embodiment"), transceiver 308 is a Bluetooth device comprising a digital component (e.g., a Bluetooth controller) and an analog component (e.g., a Bluetooth radio).

In the present embodiment, transceiver 308 comprises an antenna 305 for receiving or transmitting radio signals, a radio frequency (RF) module 310, a link controller 320, a microcontroller (or central processing unit) 330, and an external interface 340. In the present embodiment, transceiver 308 is coupled by a system bus 300 to a Bluetooth-enabled device 390 (e.g., a host device such as a computer system or similar intelligent electronic device, a PDA, a printer, a fax machine, etc.). However, it is appreciated that in another embodiment, transceiver 308 may be integrated into Bluetooth-enabled device 390.

In the Bluetooth embodiment, RF module 310 is a Bluetooth radio. The Bluetooth radio can provide: a bridge to existing data networks, a peripheral interface, and a mechanism to form piconets of connected devices away from fixed network infrastructures (see FIG. 2).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 320 is a hardware digital signal processor for performing baseband processing as well as other functions such as Quality-of-Service, asynchronous transfers, synchronous transfers, audio coding, and encryption (refer also to FIG. 6, below). Link controller 320 has two major states: standby and connection. In addition, there are seven substates: page, page scan, inquiry, inquiry scan, master response, slave response, and inquiry response. The substates are interim states that are used to add new slaves to a piconet (FIG. 2).

Continuing with reference to FIG. 3, in one embodiment, microcontroller 330 is an application specific integrated circuit (ASIC). In the Bluetooth embodiment, microcontroller 330 is a separate central processing unit (CPU) core for managing transceiver 308 and for handling some inquiries and requests without having to involve the host device. In the Bluetooth embodiment, microcontroller 330 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 308 in "sniff" mode, "hold" mode, "park" mode or "standby" mode. Refer also to FIG. 6, below.

The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

In the present embodiment, before any connections between Bluetooth devices are created, all devices are in standby mode; that is, the standby mode is the default mode of a Bluetooth device. The standby mode is a low power mode in which an unconnected unit "listens" for messages at a regular rate (generally, every 2.56 seconds according to the Bluetooth specification) on a set of hop frequencies defined for that unit. Link controller 320 may leave the standby mode to scan for page or inquiry messages, or to transmit a page or inquiry message. When responding to a page message, the Bluetooth device enters the connection state as a slave. When carrying out a successful page attempt, the Bluetooth device enters the connection state as a master.

A connection between devices is made by a page message if the address is already known, or by an inquiry message followed by a page message if the address is unknown. The inquiry message enables the Bluetooth device to discover which other Bluetooth units are in range and what their addresses are, as well as other information such as their clocks and class-of-device. A "discoverable device" is a Bluetooth device in range that will respond to an inquiry (normally in addition to responding to a page). A discoverable device scans for inquiry messages, referred to as "inquiry scan." A "connectable device" is a Bluetooth device in range that will respond to a page. Additional information is provided in conjunction with FIGS. 7A, 7B and 8, below.

With reference still to FIG. 3, in the present embodiment, interface 340 is for coupling transceiver 308 to Bluetooth-enabled device 390 in a suitable format. Transceiver 308 may be coupled by system bus 300 to Bluetooth-enabled device 390 (e.g., a host device such as a computer system or similar intelligent electronic device, a PDA, a printer, a fax machine, etc.), or transceiver 308 may be integrated into Bluetooth-enabled device 390.

In accordance with the present invention, Bluetooth-enabled device 390 may be powered down (turned off) while transceiver 308 continues to function, for example, in the standby mode. Thus, with Bluetooth-enabled device 390 powered off, transceiver 308 may remain connectable. However, in accordance with the present invention, when Bluetooth-enabled device 390 is powered off, transceiver 308 does not remain discoverable. When Bluetooth-enabled device 390 is powered on, then transceiver 308 is discoverable in accordance with the present invention. Additional information is provided in conjunction with FIG. 8, below.

Continuing with reference to FIG. 3, in the present embodiment, interface 340 runs software that allows transceiver 308 to interface with the operating system of Bluetooth-enabled device 390. In accordance with the present invention, interface 340 may be any of a variety of physical bus interfaces, including but not limited to a Universal Serial Bus (USB) interface, a Personal Computer (PC) Card interface, a CardBus or Peripheral Component Interconnect (PCI) interface, a mini-PCI interface, a Personal Computer Memory Card International Association (PCMCIA) interface, an Industry Standard Architecture (ISA) interface, or a RS-232 interface.

Figure 4:
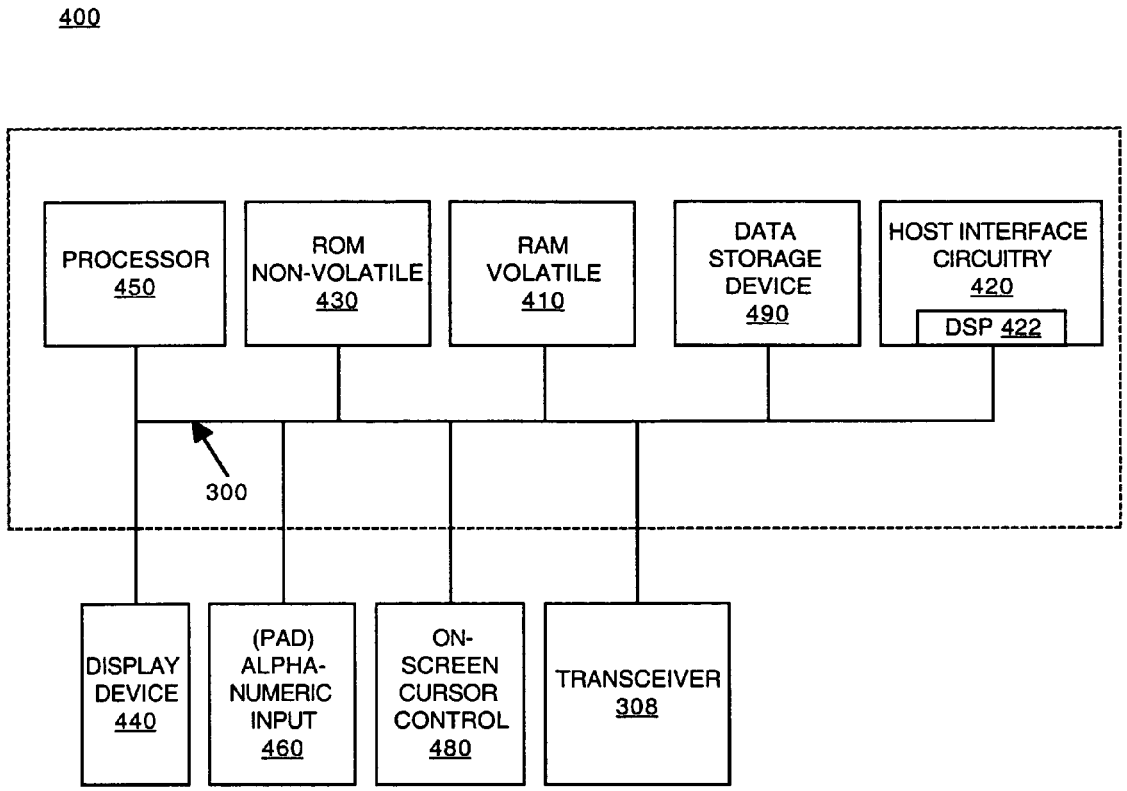
FIG. 4 is a block diagram of an exemplary portable computer system coupled to the Bluetooth wireless transceiver of FIG. 3 in accordance with one embodiment of the present invention.

FIG. 4 is a block diagram of one embodiment of a host device that can be used in accordance with the present invention. In the present embodiment, the host device is a portable computer system 400; however, it is appreciated that the host device may be another type of intelligent electronic device. In the Bluetooth embodiment, portable computer system 400 is a Bluetooth-enabled device (e.g., device 390 of FIG. 3) coupled with a Bluetooth transceiver 308. Portable computer system 400 is also referred to as a PDA, a portable information device (PID), a palmtop or hand-held computer system.

Continuing with reference to FIG. 4, portable computer system 400 includes an address/data bus 300 for communicating information, a central processor 450 coupled with the bus 300 for processing information and instructions, a volatile memory 410 (e.g., random access memory, RAM) coupled with the bus 300 for storing information and instructions for the central processor 450, and a non-volatile memory 430 (e.g., read only memory, ROM) coupled with the bus 300 for storing static information and instructions for the processor 450. Portable computer system 400 also includes an optional data storage device 490 (e.g., a memory stick) coupled with the bus 300 for storing information and instructions. Device 490 can be removable. Portable computer system 400 also contains a display device 440 coupled to the bus 300 for displaying information to the computer user.

Portable computer system 400 also includes a signal transmitter/receiver (transceiver) device 308, which is coupled to bus 300 for providing a wireless radio (RF) communication link between portable computer system 400 and other wireless devices. In the Bluetooth embodiment, transceiver 308 is compliant with the Bluetooth specification; see FIG. 3.

In the Bluetooth embodiment, in accordance with the present invention, portable computer system 400 of FIG. 4 may be powered down (turned off) while transceiver 308 continues to function, for example, in the standby mode. Thus, with portable computer system 400 powered off, transceiver 308 may remain connectable. However, in accordance with the present embodiment of the present invention, when portable computer system 400 is powered off, transceiver 308 does not remain discoverable. When portable computer system 400 is powered on, then transceiver 308 is discoverable in accordance with the present invention. Additional information is provided in conjunction with FIG. 8, below.

In one embodiment, portable computer system 400 includes host interface circuitry 420 coupled to bus 300. Host interface circuitry 420 includes an optional digital signal processor (DSP) 422 for processing data to be transmitted or data that are received via transceiver 308. Alternatively, processor 450 can perform some or all of the functions performed by DSP 422.

Also included in computer system 400 is an optional alphanumeric input device 460 that, in one implementation, is a handwriting recognition pad ("digitizer"). Alphanumeric input device 460 can communicate information and command selections to processor 450 via bus 300. In one implementation, alphanumeric input device 460 is a touch screen device. Alphanumeric input device 460 is capable of registering a position where a stylus element (not shown) makes contact.

Portable computer system 400 also includes an optional cursor control or directing device (on-screen cursor control 480) coupled to bus 300 for communicating user input information and command selections to processor 450. In one implementation, on-screen cursor control device 480 is a touch screen device incorporated with display device 440. On-screen cursor control device 480 is capable of registering a position on display device 440 where a stylus element makes contact. The display device 440 utilized with portable computer system 400 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 440 is a flat panel display.

Figure 5:
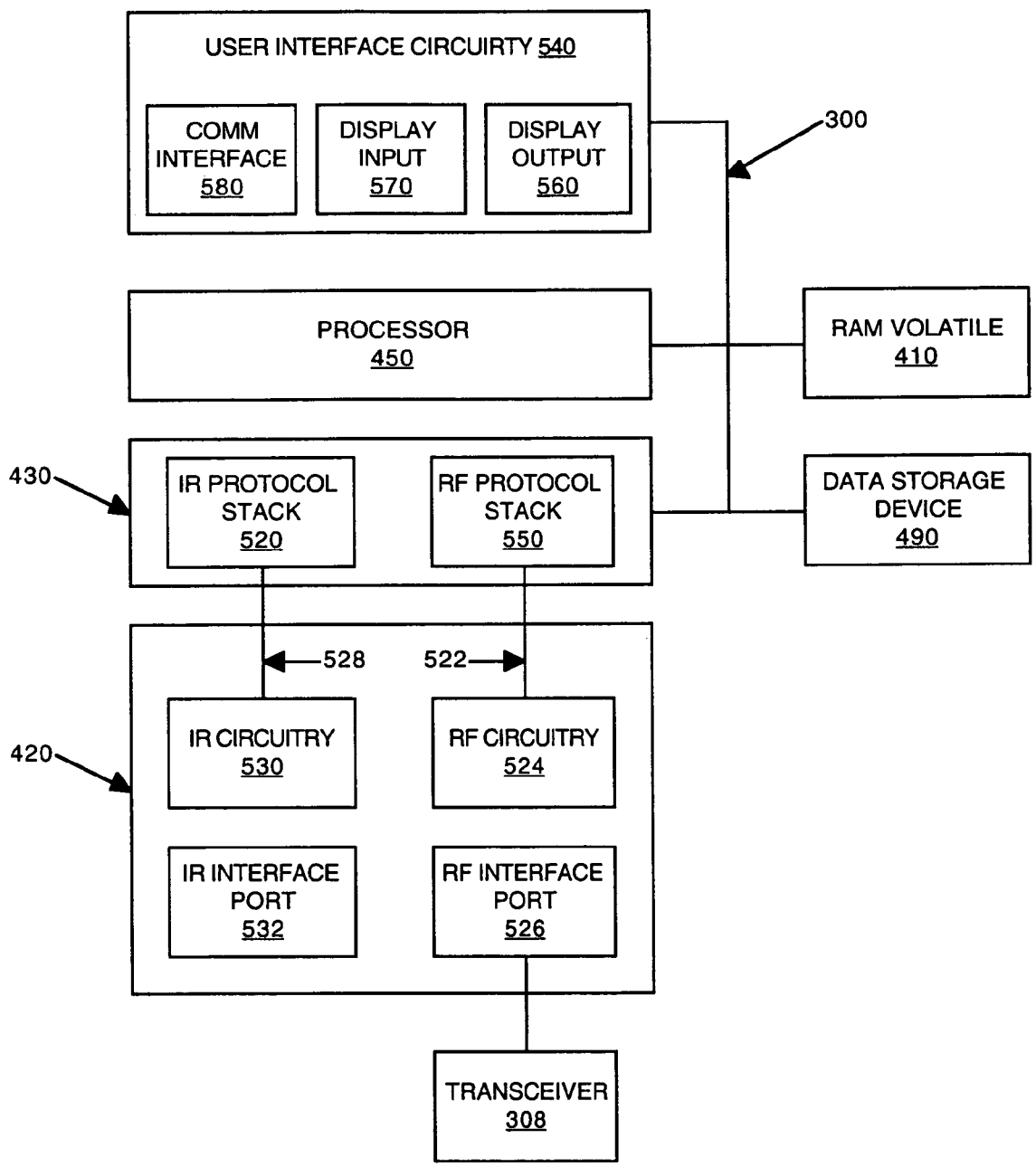
FIG. 5 is a block diagram showing features of the portable computer system of FIG. 4 in accordance with one embodiment of the present invention.

FIG. 5 is a block diagram showing additional features of portable computer system 400 in accordance with one embodiment of the present invention. User interface circuitry 540 is coupled to processor 450 via bus 300. User interface circuitry includes hardware and software components that provide user input and output resources for functions performed by processor 450. In the present embodiment, user interface circuitry 540 includes a display output 560, a display input 570, and communication interface 580.

In this embodiment, display output 560 receives digital information representing graphical information from processor 450, and converts the information to a graphical display, such as text and/or images, for display on display device 440 (FIG. 4), for example. Display input 570 may receive data inputs, such as graphical data inputs, from a user. The graphical data inputs can be entered by the user with a stylus element on the pressure-sensitive display device 440 (specifically, on-screen cursor control device 480, FIG. 4) or the alphanumeric input device 460 (FIG. 4).

The communication interface 580 allows the user to enter other types of data, such as audio or video data, or data formatted for operation with particular applications executed by portable computer system 400, such as calendar data, electronic mail data, word processing, databases, and the like. In one embodiment of the present invention, the communication interface 580 is a serial communication port, but could also alternatively be of any of a number of well-known communication standards and protocols, e.g., parallel, SCSI (small computer system interface), Firewire (IEEE 1394), Ethernet, etc.

Host interface circuitry 420 is coupled to processor 450 via bus 300. Host interface circuitry 420 (or link interface circuitry or data interface circuitry) illustrates, but is not limited to, two alternative link interface ports for establishing a wireless link to another device: an RF interface port 526 and an infrared (IR) interface port 532.

In the present embodiment, RF circuitry 524 converts signals to radio frequency output and accepts radio frequency input via RF interface port 526. In the Bluetooth embodiment, RF interface port 526 is a Bluetooth transceiver 308 (FIG. 3). RF signals received by RF circuitry 524 are converted to electrical signals and relayed to RF protocol stack 550 via connection 522.

In the present embodiment, IR circuitry 530 converts signals into infrared output and accepts infrared input via IR interface port 532. Infrared communication signals received by IR circuitry 530 are converted to electrical signals that are relayed to IR protocol stack 520 via connection 528.

Processor 450 is capable of executing RF protocol stack 550 and IR protocol stack 520. IR stack 520 implements an IR protocol to support infrared links with other devices.

Figure 6:
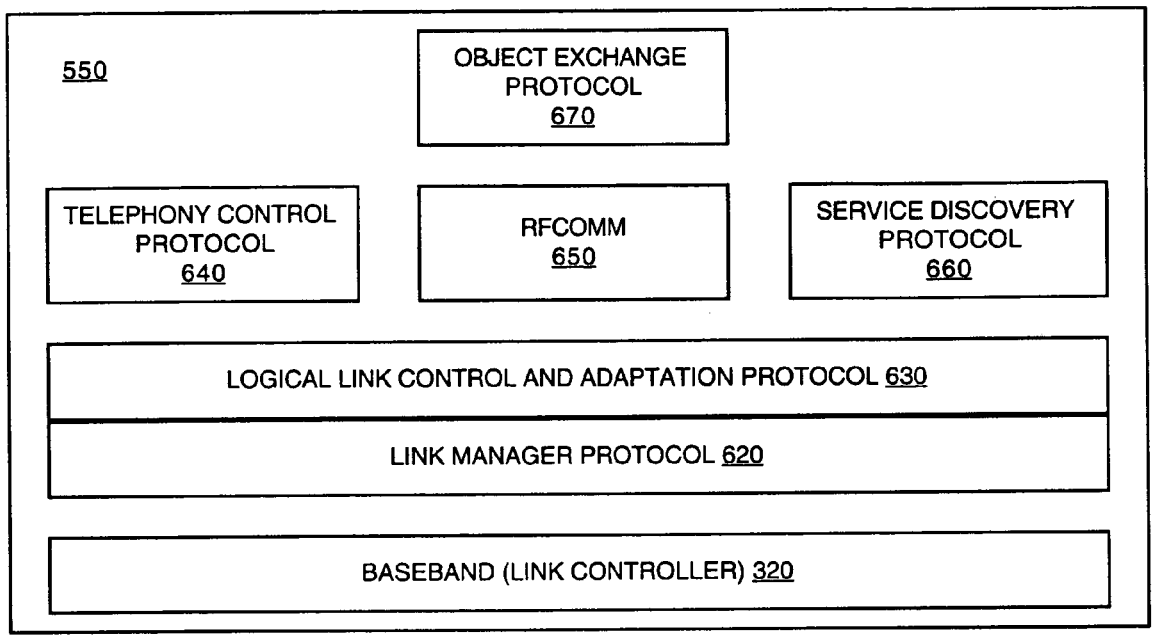
FIG. 6 is a block diagram illustrating a protocol stack used by a Bluetooth-enabled device in accordance with one embodiment of the present invention.

FIG. 6 is a block diagram illustrating the layers of the RF protocol stack 550 used by a Bluetooth-enabled device such as portable computer system 400 of FIG. 4 in accordance with one embodiment (the Bluetooth embodiment) of the present invention. The layers of RF protocol stack 550 include baseband (link controller) layer 320, Link Manager Protocol (LMP) layer 620, Logical Link Control and Adaptation Protocol (L2CAP) layer 630, Telephony Control Protocol (TCS) layer 640, RFCOMM layer 650, Service Discovery Protocol (SDP) layer 660, and Object Exchange Protocol (OBEX) layer 670.

Continuing with reference to FIG. 6, in the present embodiment, baseband layer 320 carries out baseband protocols and other low-level link routines. LMP layer 620 is used for link set-up, security and control. L2CAP layer 630 supports higher level protocol multiplexing, packet segmentation and reassembly, and the conveying of quality-of-service information. TCS layer 640 defines the call control signaling for the establishment of speech and data calls between Bluetooth devices. RFCOMM layer 650 provides emulation of serial ports over the L2CAP protocol 630. SDP layer 660 provides a means for applications to discover which services are available, and the characteristics of the services. OBEX layer 670 enables the exchange of data objects. Additional information is provided by "Specification of the Bluetooth System, Core," version 1.0B, dated Dec. 1, 1999, herein incorporated by reference in its entirety.

Figure 7A:
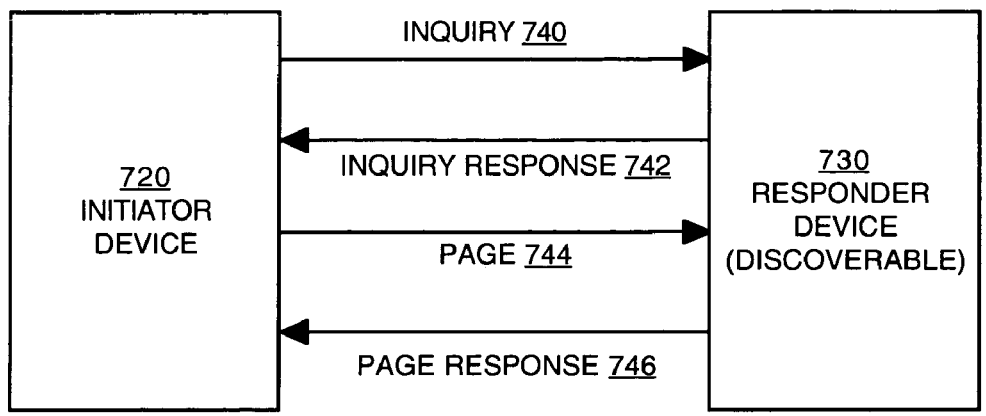
FIG. 7A is a data flow diagram illustrating a device discovery process for a discoverable device in accordance with one embodiment of the present invention.

FIG. 7A is a data flow diagram 700a illustrating a device discovery process for a discoverable device (responder device 730) in accordance with one embodiment of the present invention. In the Bluetooth embodiment, initiator device 720 and responder device 730 are Bluetooth-enabled devices (refer to FIGS. 3 and 4). To simplify the discussion, the present invention is discussed for a single initiator device and responder device; however, it is understood that the present invention can be utilized with multiple initiator and responder devices.

In the present embodiment, initiator device 720 sends (broadcasts) an inquiry 740 which is intended to be received by responder device 730. Responder device 730 must be discoverable in order to receive inquiry 740, meaning that responder device 730 is scanning for inquiry messages. When responder device 730 is in discoverable mode, it sends inquiry response 742 to initiator device 720 in response to inquiry 740. In accordance with the present invention, responder device 730 is in the discoverable mode when the device is powered on (in awake mode).

Figure 7B:
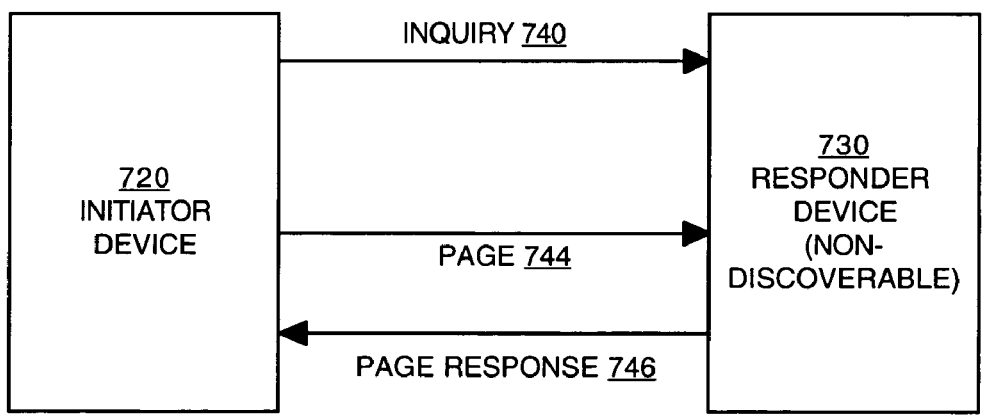
FIG. 7B is a data flow diagram illustrating a device discovery process for a non-discoverable device in accordance with one embodiment of the present invention.

With reference next to FIG. 7B illustrating data flow diagram 700b, responder device 730 is non-discoverable (not in the discoverable mode) when the device is powered off (in sleep mode or standby). In one embodiment, when non-discoverable, responder device 730 may not be scanning for inquiry messages 740. In another embodiment, when non-discoverable, responder device 730 may scan for inquiry messages 740, but will not send an inquiry response 742 in response to an inquiry message 740.

With reference to FIGS. 7A and 7B, responder device 730 is connectable when it is in either discoverable mode or in non-discoverable mode. That is, responder device 730 can receive a directed message (a message that specifies responder device 730 by its name and/or address, such as page 744) from initiator device 720. In addition, when connectable, responder device 730 can respond to page 744 (e.g., page response 746).

Figure 8:
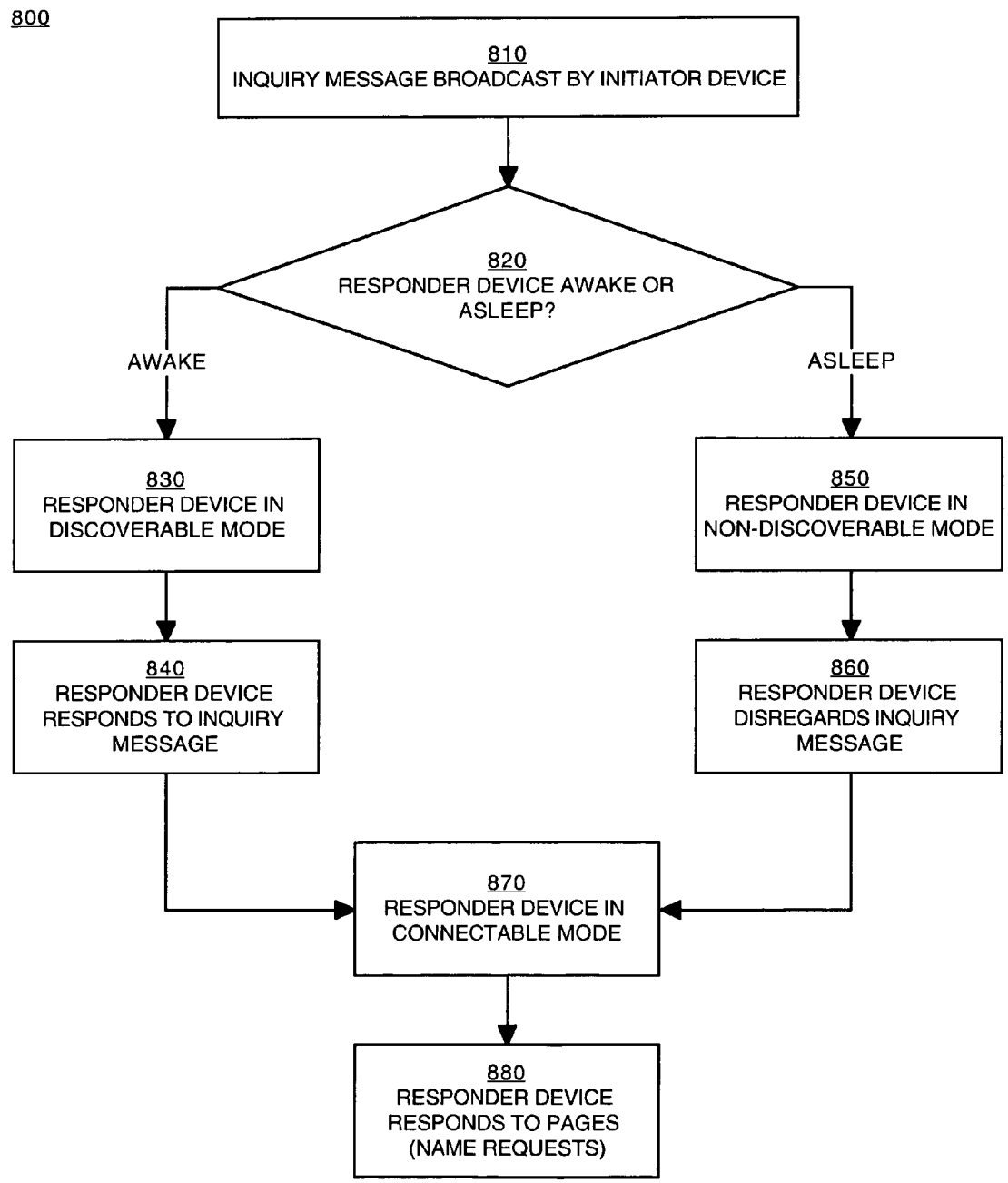
FIG. 8 is a flowchart of the steps for managing a device discovery process in accordance with one embodiment of the present invention.

FIG. 8 is a flowchart of the steps for managing a device discovery process 800 in accordance with one embodiment of the present invention. Process 800 is implemented as computer-readable program instructions stored in a memory unit (e.g., ROM non-volatile 430 of FIG. 4; specifically, RF protocol stack 550 of FIG. 5) and executed by a processor (e.g., processor 450 or DSP 422 of FIG. 4). In the Bluetooth embodiment, portable computer system 400 is Bluetooth-enabled.

In step 810 of FIG. 8, with reference also to FIGS. 7A and 7B, inquiry message 740 is broadcast by initiator device 720.

In step 820 of FIG. 8, also with reference to FIGS. 7A and 7B, responder device 730 can be either powered on (awake) or powered off (asleep). If awake, process 800 proceeds to step 830; if asleep, process 800 proceeds to step 850.

In step 830 of FIG. 8, with reference also to FIG. 7A, in accordance with the present invention, responder device 730 is in discoverable mode when it is powered on (awake). In one embodiment, when the user turns on responder device 730, the device is automatically placed into the discoverable mode. In the Bluetooth embodiment, transceiver 308 (FIGS. 3, 4 and 5) is in discoverable mode. In discoverable mode, transceiver 308 is scanning for and can respond to inquiry 740.

In step 840 of FIG. 8, and with reference to FIG. 7A, in accordance with the present invention, with responder device 730 in discoverable mode, responder device 730 sends inquiry response 742 to initiator device 720.

In step 850 of FIG. 8, with reference also to FIG. 7B, in accordance with the present invention, responder device 730 is in non-discoverable mode when it is powered off (asleep). In one embodiment, when the user turns off responder device 730, the device is automatically placed into the non-discoverable mode. In the Bluetooth embodiment, transceiver 308 (FIGS. 3, 4 and 5) is in non-discoverable mode. In one embodiment, when in non-discoverable mode, transceiver 308 does not scan for inquiry message 740. In another embodiment, when in non-discoverable mode, transceiver 308 may scan for inquiry message 740, but will not respond to inquiry message 740 when such a message is detected.

In step 860 of FIG. 8, with reference also to FIG. 7B, in accordance with the present invention, with responder device 730 in non-discoverable mode, responder device 730 does not send inquiry response 742 to initiator device 720.

Therefore, in accordance with the present invention, responder device 730 is automatically made discoverable or non-discoverable depending on whether the device is powered on or powered off, as described above. Accordingly, the device discovery process can be managed by the user in a way that is both user-friendly and intuitively understood by the user. For example, when the user turns responder device 730 on, it automatically is placed into discoverable mode, and turning the device off automatically places responder device 730 into non-discoverable mode. In essence, the on/off switch of responder device 730 also functions as the mechanism by which the user selects either discoverable or non-discoverable mode. Thus, a user can manage the device discovery process according to a usage model already understood by the user.

In accordance with the present invention, responder device 730 is in discoverable mode for a reduced period of time, thereby conserving power (battery) resources. As such, responder device 730 will also respond to fewer inquiries 740, which in turn will reduce the number of pages 744 and page responses 746. Consequently, responder device 730 and initiator device 720 will exchange fewer messages, further conserving battery resources for responder device 730 and also conserving the battery resources of initiator device 720. Fewer messages will also improve the efficiency of the Bluetooth device discovery process, because fewer collisions between messages would be expected, and therefore the frequency at which messages have to be retransmitted would be reduced. Furthermore, the device discovery process will be simplified for users. For example, owing to the reduction in pages 744 and page responses 746 attributable to the reduction in inquiry responses 742, the number of name requests and name request responses will also be reduced, and hence the number of user-friendly names displayed to users as part of the name discovery process will be reduced.

Additionally, the present invention can be implemented consistent with and within the framework of the Bluetooth specification. As such, Bluetooth-enabled devices implementing the present invention remain compatible with legacy Bluetooth-enabled currently being used. Moreover, the present invention can also be incorporated into legacy Bluetooth devices, for example, by installing appropriate program instructions.

With reference again to FIG. 8 and with reference also to FIGS. 7A and 7B, in step 870, responder device 730 is connectable when it is in either discoverable mode or in non-discoverable mode. That is, in accordance with the present invention, responder device 730 can receive a directed message (e.g., page 744) from initiator device 720 whether responder device is in the discoverable mode or the non-discoverable mode.

For example, at some earlier point in time when responder device 730 was in discoverable mode, it may have provided its address (device access code) to initiator device 720. Initiator device can then use that address to send a directed message to responder device 730 (a page 744 instead of a broadcast message such as inquiry 740). Thus, messages from devices that have previously been made known to responder device 730 can be received by responder device 730 whether it is discoverable or non-discoverable. The present invention therefore provides another advantage by, in essence, screening messages from devices that are unknown to responder device 730 as well as the user. Because the user controls when responder device 730 is and is not discoverable, the user also controls access to responder device 730 by unknown devices. That is, an unknown device cannot make contact with responder device 730 without the user's knowledge and permission.

In step 880 of FIG. 8, with reference to FIGS. 7A and 7B, responder device 730 can respond to page 744 in page response 746. In addition, initiator device 720 and responder device 730 can establish a persistent connection. Therefore, even if responder device 730 is non-discoverable in accordance with the present invention, it will remain connectable. The connectable mode consumes less power than the discoverable mode. In the discoverable mode, responder device 730 receives and responds to all broadcast messages sent from other devices within range, whereas in the connectable mode responder device 730 only receives and responds to directed messages. Because there are fewer directed messages than broadcast messages, less power will be consumed receiving and responding to directed messages relative to the power consumed receiving and responding to broadcast messages.

In summary, the present invention provides a user-friendly system and method for managing the Bluetooth device discovery process. The present invention also provides a system and method can reduce the burden on the limited power resources available to many types of Bluetooth devices. In addition, the present invention provides a system and method that can be implemented in Bluetooth-enabled devices, that is consistent with the Bluetooth specification, and that can be incorporated into legacy Bluetooth devices.

The preferred embodiment of the present invention, power-conserving intuitive device discovery technique in a Bluetooth environment, is thus described. While the present invention has been described in particular embodiments, it should be appreciated that the present invention should not be construed as limited by such embodiments, but rather construed according to the following claims.

What is claimed is:

1. In a responder device having a transceiver for wireless communication, a method for managing responses to signals received from initiator devices, said method comprising:
   automatically setting said responder device to discoverable mode when said responder device enters awake mode, wherein said responder device in said discoverable mode scans for and responds to broadcast wireless signals that are broadcast by initiator devices;
   automatically setting said responder device to non-discoverable mode when said responder device enters standby mode, wherein said responder device in said non-discoverable mode does not scan for and does not respond to broadcast wireless signals that are broadcast by initiator devices, and wherein said standby mode is a power-conserving mode relative to said awake mode; and
   automatically setting said responder device to connectable mode with said responder device in either said awake mode or said standby mode, wherein said responder device in said connectable mode receives and responds to directed wireless signals from initiator devices, wherein directed wireless signals specifically identify said responder device.

2. The method as recited in claim 1 further comprising:
   receiving at said responder device a first wireless signal broadcast by an initiator device;
   sending a second wireless signal in response to said first wireless signal when said responder device is in said discoverable mode, wherein said second wireless signal is to be received by said initiator device; and
   disregarding said first wireless signal when said responder device is in said non-discoverable mode.

3. The method as recited in claim 2 further comprising:
   receiving a third wireless signal from said initiator device, wherein said third wireless signal is a directed signal sent to said responder device in response to said second wireless signal.

4. The method as recited in claim 3 wherein said responder device is in a connectable mode at all times said responder device is powered on.

5. The method as recited in claim 2 wherein said initiator device and said responder device are Bluetooth-enabled devices.

6. The method as recited in claim 5 wherein said first wireless signal is an inquiry message requesting an address for said responder device.

7. The method as recited in claim 6 wherein said second wireless signal comprises said address for said responder device.

8. The method as recited in claim 7 wherein said third wireless signal is a page message directed to said address and comprising a request for a name of said responder device.

9. The method as recited in claim 1 wherein said responder device is a portable computer system.

10. In a responder device having a transceiver for wireless communication, a method for managing responses to signals received from initiator devices, said method comprising:
   receiving at said responder device a first wireless signal broadcast by an initiator device, wherein said first wireless signal is a broadcast signal also received by multiple responder devices within range of said initiator device;
   automatically entering a discoverable mode when said responder device enters awake mode, wherein said responder device in said discoverable mode sends a second wireless signal in response to said first wireless signal, wherein said second wireless signal is to be received by said initiator device;
   automatically entering a non-discoverable mode when said responder device enters standby mode, wherein said responder device in said non-discoverable mode receives but does not send a response to said first wireless signal, and wherein said standby mode is a power-conserving mode relative to said awake mode; and
   automatically entering a connectable mode with said responder device in either said awake mode or said standby mode, wherein said responder device in said connectable mode receives and responds to a directed wireless signal from initiator device, wherein said directed wireless signal specifically identifies said responder device so that only said responder device and not any other of said multiple responder devices within said range of said initiator device receives said directed wireless signal.

11. The method as recited in claim 10 further comprising:
   receiving a third wireless signal from said initiator device, wherein said third wireless signal is a directed signal sent to said responder device in response to said second wireless signal.

12. The method as recited in claim 11 wherein said responder device is in a connectable mode at all times said responder device is powered on.

13. The method as recited in claim 11 wherein said initiator device and said responder device are Bluetooth-enabled devices.

14. The method as recited in claim 13 wherein said first wireless signal is an inquiry message requesting an address for said responder device.

15. The method as recited in claim 13 wherein said second wireless signal comprises said address for said responder device.

16. The method as recited in claim 15 wherein said third wireless signal is a page message directed to said address and comprising a request for a name of said responder device.

17. The method as recited in claim 10 wherein said responder device is a portable computer system.

18. A responder device comprising:
   a bus;
   a wireless transceiver unit coupled to said bus and for communicating with initiator devices; and
   a processor coupled to said bus, said processor for performing a method for managing responses to signals received from said initiator devices, said method comprising:
      automatically setting said responder device to discoverable mode when said responder device enters awake mode, wherein said responder device in said discoverable mode scans for and responds to broadcast wireless signals that are broadcast by initiator devices;
      automatically setting said responder device to non-discoverable mode when said responder device enters standby mode, wherein said responder device in said non-discoverable mode does not scan for and does not respond to broadcast wireless signals that are broadcast by initiator devices, and wherein said standby mode is a power-conserving mode relative to said awake mode; and
      automatically setting said responder device to connectable mode with said responder device in either said awake mode or said standby mode, wherein said responder device in said connectable mode receives and responds to directed wireless signals from initiator devices, wherein directed wireless signals specifically identify said responder device.

19. The responder device of claim 18 wherein said method further comprises:
   receiving at said responder device a first wireless signal broadcast by an initiator device;
   sending a second wireless signal in response to said first wireless signal when said responder device is in said discoverable mode, wherein said second wireless signal is to be received by said initiator device; and
   disregarding said first wireless signal when said responder device is in said non-discoverable mode.

20. The responder device of claim 19 wherein said method further comprises:
   receiving a third wireless signal from said initiator device, wherein said third wireless signal is a directed signal sent to said responder device in response to said second wireless signal.

21. The responder device of claim 20 wherein said responder device is in a connectable mode at all times said responder device is powered on.

22. The responder device of claim 20 wherein said initiator device and said responder device are Bluetooth-enabled devices.

23. The responder device of claim 22 wherein said first wireless signal is an inquiry message requesting an address for said responder device.

24. The responder device of claim 23 wherein said second wireless signal comprises said address for said responder device.

25. The responder device of claim 24 wherein said third wireless signal is a page message directed to said address and comprising a request for a name of said responder device.

26. The responder device of claim 18 wherein said responder device is a portable computer system.

* * * * *